US010506581B2

(12) United States Patent
Kikuma et al.

(10) Patent No.: US 10,506,581 B2
(45) Date of Patent: Dec. 10, 2019

(54) POINT-TO-POINT RADIO SYSTEM, POINT-TO-POINT RADIO APPARATUS, AND COMMUNICATION CONTROL METHOD

(71) Applicant: NEC Corporation, Tokyo (JP)

(72) Inventors: Tomohiro Kikuma, Tokyo (JP); Hiroaki Miyamoto, Kanagawa (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 15/126,051

(22) PCT Filed: Feb. 18, 2015

(86) PCT No.: PCT/JP2015/000741
§ 371 (c)(1),
(2) Date: Sep. 14, 2016

(87) PCT Pub. No.: WO2015/141127
PCT Pub. Date: Sep. 24, 2015

(65) Prior Publication Data
US 2017/0118750 A1     Apr. 27, 2017

(30) Foreign Application Priority Data
Mar. 18, 2014   (JP) ................................. 2014-054548

(51) Int. Cl.
*H04W 72/04*     (2009.01)
*H04W 72/02*     (2009.01)

(52) U.S. Cl.
CPC ....... *H04W 72/0426* (2013.01); *H04W 72/02* (2013.01); *H04W 72/0453* (2013.01)

(58) Field of Classification Search
CPC ......... H04W 72/0426; H04W 72/0453; H04W 36/22; H04W 36/0088
See application file for complete search history.

(56) References Cited

U.S. PATENT DOCUMENTS

2005/0037766 A1   2/2005  Hans et al.
2010/0177670 A1   7/2010  Hottinen
(Continued)

FOREIGN PATENT DOCUMENTS

EP     1545037 B1    1/2007
GB     2490110 A    10/2012
(Continued)

OTHER PUBLICATIONS

Extended European Search Report issued in European Patent Application No. 15765554.9, dated Oct. 26, 2017, 7 pages.
(Continued)

*Primary Examiner* — Anez C Ebrahim
(74) *Attorney, Agent, or Firm* — Wilmer Cutler Pickering Hale and Dorr LLP

(57) ABSTRACT

A radio apparatus (1) notifies a radio apparatus (2) of a new reverse channel to be used in a reverse link (52) and another idle reverse channel(s). If reachability of a forward link (51) is lost by the use of a new forward channel associated with the new reverse channel, the radio apparatus (2) determines a further new forward channel from among forward channel(s) associated with the idle reverse channel(s) of which the radio apparatus (2) has been notified by the radio apparatus (1). This contributes, for example, to a safe switch of the bidirectional operating radio channels without using a redundant connection, when frequency-division multiplexing with fixed frequency spacing is used.

36 Claims, 5 Drawing Sheets

(56) References Cited

U.S. PATENT DOCUMENTS

2013/0322413 A1\* 12/2013 Pelletier ............ H04W 72/1289
370/336
2014/0153417 A1\* 6/2014 Gupta ............... H04W 52/0219
370/252

FOREIGN PATENT DOCUMENTS

| JP | 2003-516063 A | 5/2003 |
| JP | 2004-187089 A | 7/2004 |
| JP | 2012-004951 A | 1/2012 |

OTHER PUBLICATIONS

International Search Report corresponding to PCT/JP2015/000741, dated May 26, 2015 (3 pages).

\* cited by examiner

POINT-TO-POINT RADIO SYSTEM, POINT-TO-POINT RADIO APPARATUS, AND COMMUNICATION CONTROL METHOD

CROSS-REFERENCE TO RELATED APPLICATIONS

This application is a national stage application of International Application No. PCT/JP2015/000741 entitled "Point-To-Point Radio System, Point-To-Point Radio Apparatus, and Communication Control Method," filed on Feb. 18, 2015, which claims the benefit of the priority of Japanese Patent Application No. 2014-054548, filed on Mar. 18, 2014, the disclosures of each of which are hereby incorporated by reference in their entirety.

TECHNICAL FIELD

The present disclosure relates to switching control of radio channels in a point-to-point radio system.

BACKGROUND ART

Point-to-point radio systems that use microwaves, millimeter waves or the like are known (see, for example, Patent Literature 1). In a point-to-point radio system, two communication apparatuses perform digital communication via a point-to-point radio link. Specifically, each of the communication apparatuses is equipped with a directional antenna to communicate with a counterpart apparatus by means of a point-to-point radio technology and forms a directional beam toward the counterpart apparatus. The point-to-point radio link is thus established between the two communication apparatuses. In this specification, each of the two communication apparatuses constituting the point-to-point radio system, i.e., each communication apparatus that communicates with a counterpart apparatus by means of the point-to-point radio technology is referred to as a point-to-point radio apparatus.

In one example, a point-to-point radio system uses Frequency Division Duplexing (FDD) to perform simultaneous bidirectional communication (full-duplex communication). Further, the pair of operating radio channels that are used for the bidirectional radio links may be fixed. In this case, the point-to-point radio system uses a two radio channels with fixed frequency spacing for FDD. Each radio channel may be referred to as a radio frequency carrier.

Consider, for example, a case in which a frequency band of 59 to 63 GHz (i.e., an unlicensed band) is used for FDD and the channel spacing is set to 50 MHz. In this case, 40 channels whose central frequencies are 59.00, 59.05, . . . , 60.90, and 60.95 GHz may be used for one radio link (this link is referred to as a forward link) and 40 channels whose central frequencies are 61.00, 61.05, . . . , 62.90, and 62.95 GHz may be used for the other radio link (this link is referred to as a reverse link). Further, considering that these radio channels are used with fixed frequency spacing, as shown in FIG. 1, two radio channels with a gap of 2 GHz (e.g., a pair of 59.00 GHz and 61.00 GHz or a pair of 59.05 GHz and 61.05 GHz) can be used for the forward link and the reverse link.

CITATION LIST

Patent Literature

[Patent Literature 1] European Patent No. 1545037
[Patent Literature 2] Japanese Unexamined Patent Application Publication No. 2004-187089

SUMMARY OF INVENTION

Technical Problem

The present inventors have conceived a recovery procedure from a unidirectional communication regarding a point-to-point radio system uses FDD with the fixed frequency spacing as stated above.

When FDD with the fixed frequency spacing is performed, if a failure (e.g., decrease in reception quality or disconnection of a radio link) occurs in one radio link (e.g., reverse link) and consequently a normal receiving on this radio link cannot be performed, the point-to-point radio system needs to switch not only the operating radio channel of the one radio link where the failure has occurred but also the operating radio channel of the other radio link (e.g., forward link) at the same time. Therefore, even though the one radio link has succeeded in returning to a state in which the communication can be normally performed on its radio channel after the switch-over, the other radio link may experience a new communication failure on its radio channel after the switch-over. In the worst case, the bidirectional communication cannot be performed in either of the radio links. It is therefore required in the system using FDD with the fixed frequency spacing to carefully perform a control procedure for recovering from the unidirectional communication, which is due to a failure in one radio link.

One method to achieve the control procedure may be providing an additional wired connection or wireless connection for maintenance or for control between the pair of point-to-point radio apparatuses. In this case, the pair of point-to-point radio apparatuses may perform a procedure for switching their operating radio channels by using a redundant connection for maintenance or for control. However, the use of a redundant connection for maintenance or for control may not be preferable in terms of the frequency utilization efficiency or the cost for the apparatuses.

Patent Literature 2 discloses a procedure for switching an operating radio channel in a radio communication system consisting of a parent wireless device and a plurality of child wireless devices. Specifically, the parent wireless device disclosed in Patent Literature 2 instructs a child wireless device to search for an idle channel, receives the result of searching for an idle channel from the child wireless device, performs a search for an idle channel by the parent wireless device itself, and instructs the child wireless device to use a new operating radio channel that has been determined based on the result of searches performed by the parent wireless device and the child wireless device. The parent and child wireless devices thus switch the operation radio channel. However, Patent Literature 2 does not consider a system that uses Frequency-Division Duplexing (FDD) with the fixed frequency spacing and does not teach a case in which the operating radio channels of the bidirectional radio links are simultaneously switched.

In view of the above, one object accomplished by embodiments disclosed in this specification is to provide a point-to-point radio system that contributes to a safe switch of the bidirectional operating radio channels without using a redundant connection for maintenance or for control, when the Frequency-Division Duplexing (FDD) with the fixed frequency spacing is used. It should be noted that this object is merely one of the objects accomplished by the embodiments disclosed in this specification. Other objects or problems and novel features will be made apparent from the following description and the accompanying drawings.

Solution to Problem

In an aspect, a point-to-point radio system includes first and second radio apparatuses configured to perform a bidirectional point-to-point radio communication. The first and second radio apparatuses are configured to cooperatively perform a procedure for changing an operating radio channel of a forward link from the first radio apparatus to the second radio apparatus and an operating radio channel of a reverse link from the second radio apparatus to the first radio apparatus. The procedure includes:

(a) transmitting, by the first radio apparatus, to the second radio apparatus, a first notification explicitly or implicitly indicating a new reverse channel to be used as the operating radio channel of the reverse link and indicating at least one idle reverse channel different from the new reverse channel and available to use in the reverse link; and (b) when a reception quality of a new forward channel associated with the new reverse channel is not satisfactory, determining, by the second radio apparatus, a further new forward channel to be used as the operating radio channel of the forward link from among at least one forward channel associated with the at least one idle reverse channel.

Advantageous Effects of Invention

According to the above aspect, it is possible to provide a point-to-point radio system that contributes to a safe switch of the bidirectional operating radio channels without using a redundant connection for maintenance or for control, when Frequency-Division Duplexing (FDD) with the fixed frequency spacing is used.

DESCRIPTION OF EMBODIMENTS

Hereinafter, specific embodiments will be described in detail with reference to the drawings. Throughout the drawings, the same or corresponding elements are denoted by the same reference symbols, and their repeated explanations will be omitted as necessary for the sake of clarity.

First Embodiment

Figure 2:
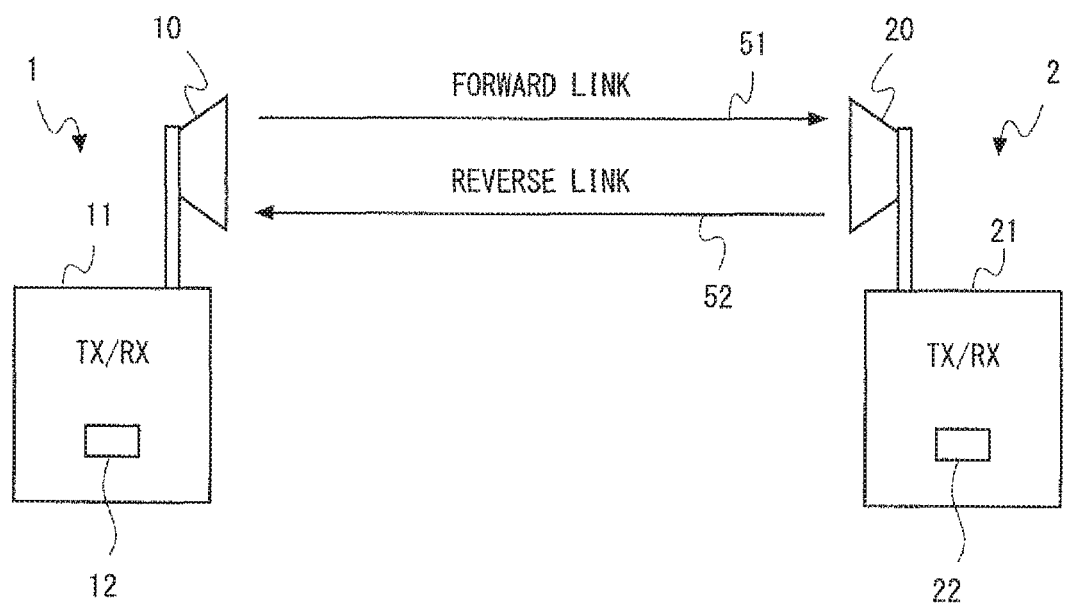
FIG. 2 is a block diagram showing a configuration example of a point-to-point radio system according to a first embodiment.

FIG. 2 shows a configuration example of a point-to-point radio system according to this embodiment. The point-to-point radio system according to this embodiment includes point-to-point radio apparatuses 1 and 2. The radio apparatuses 1 and 2 respectively include antennas 10 and 20. The antennas 10 and 20 are directional antennas. Further, the radio apparatuses 1 and 2 respectively include transceivers (radio transceivers) 11 and 21. The radio apparatuses 1 and 2 transmit directional beams toward each other to thereby establish bidirectional point-to-point radio links 51 and 52 between the antennas 10 and 20. The radio transceivers 11 and 21 bidirectionally transmit signals to each other via the radio links 51 and 52.

In the following description, for the sake of convenience of description, the radio link 51 from the radio apparatus 1 to the radio apparatus 2 is referred to as a "forward link" and the radio link 52 from the radio apparatus 2 to the radio apparatus 1 is referred to as a "reverse link". Further, each of a plurality of radio channels that are reserved for the forward link 51 and can be used in the forward link 51 is referred to as a "forward channel". In a similar way, each of a plurality of radio channels that are reserved for the reverse link 52 and can be used in the reverse link 52 is referred to as a "reverse channel". The operating radio channel of the forward link 51 is selected from the plurality of forward channels and the operating radio channel of the reverse link 52 is selected from the plurality of reverse channels.

Figure 1:
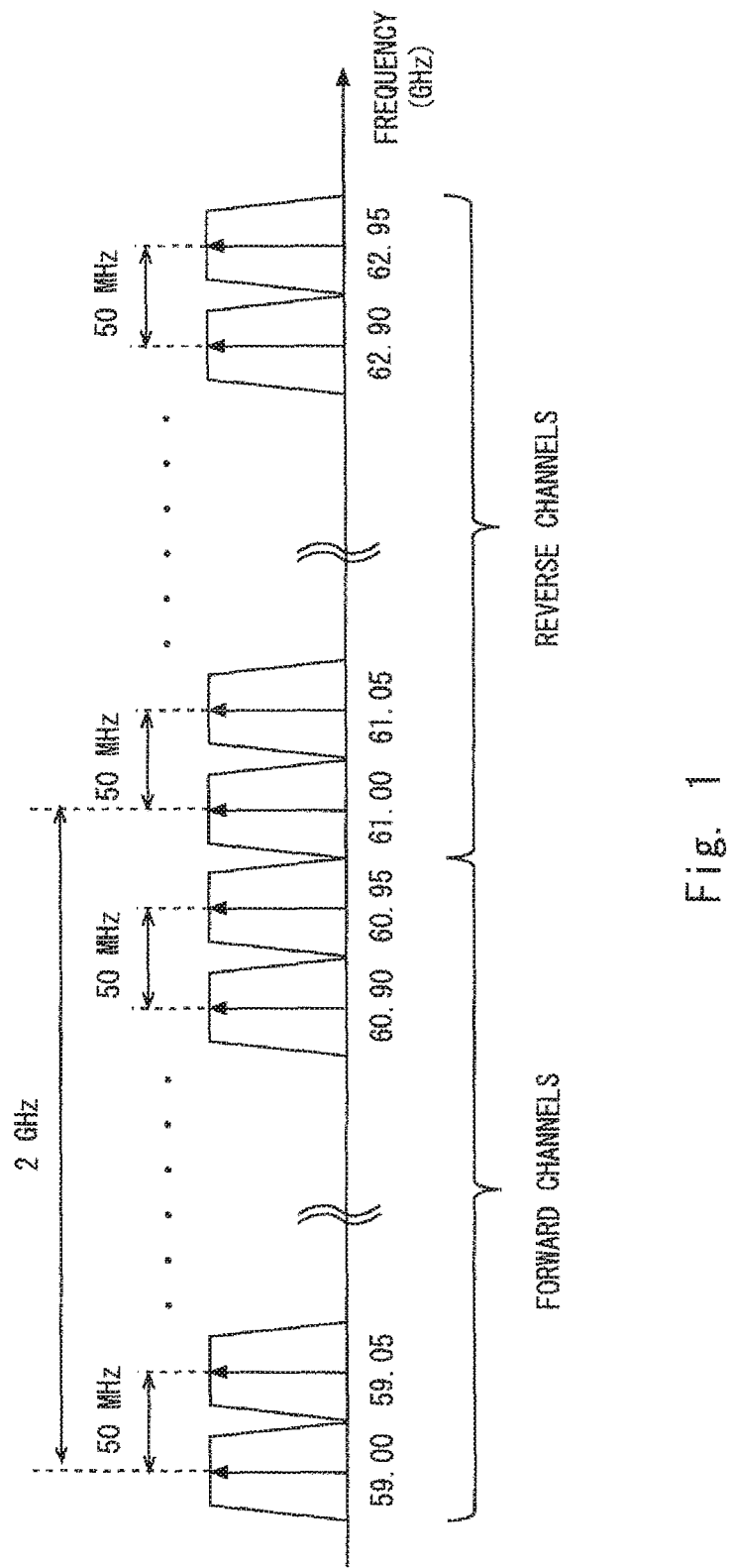
FIG. 1 is a diagram showing one example of an arrangement of radio channels in FDD with fixed frequency spacing.

The point-to-point radio system according to this embodiment uses Frequency Division Duplexing (FDD) with fixed frequency spacing. Accordingly, the operating radio channel of the forward link 51 and the operating radio channel of the reverse link 52 are spaced from each other by the fixed frequency spacing. As shown in FIG. 1, for example, the operating radio channel of the forward link 51 may be spaced from the operating radio channel of the reverse link 52 by 2 GHz. That is, each of the plurality of forward channels is associated in advance with one of the plurality of reverse channels according to the fixed frequency spacing. The operating radio channel of the forward link 51 is not determined independently from the operating radio channel of the reverse link 52 and is determined simultaneously with the operating radio channel of the reverse link 52 in accordance with the fixed frequency spacing.

The radio apparatuses 1 and 2 further include controllers 12 and 22, respectively. The controllers 12 and 22 are configured to cooperatively perform a procedure for changing the operating radio channels of the forward link 51 and the reverse link 52. The controllers 12 and 22 may further perform another control. The controllers 12 and 22 may perform, for example, Adaptive Modulation and Coding (i.e., link adaptation) in which a modulation scheme, a code rate and the like are adjusted based on the quality of the radio links 51 and 52 in order to deal with a change in a propagation state due to weather conditions (e.g., rain, fog, mist, haze, smoke, or smog).

Figure 3:
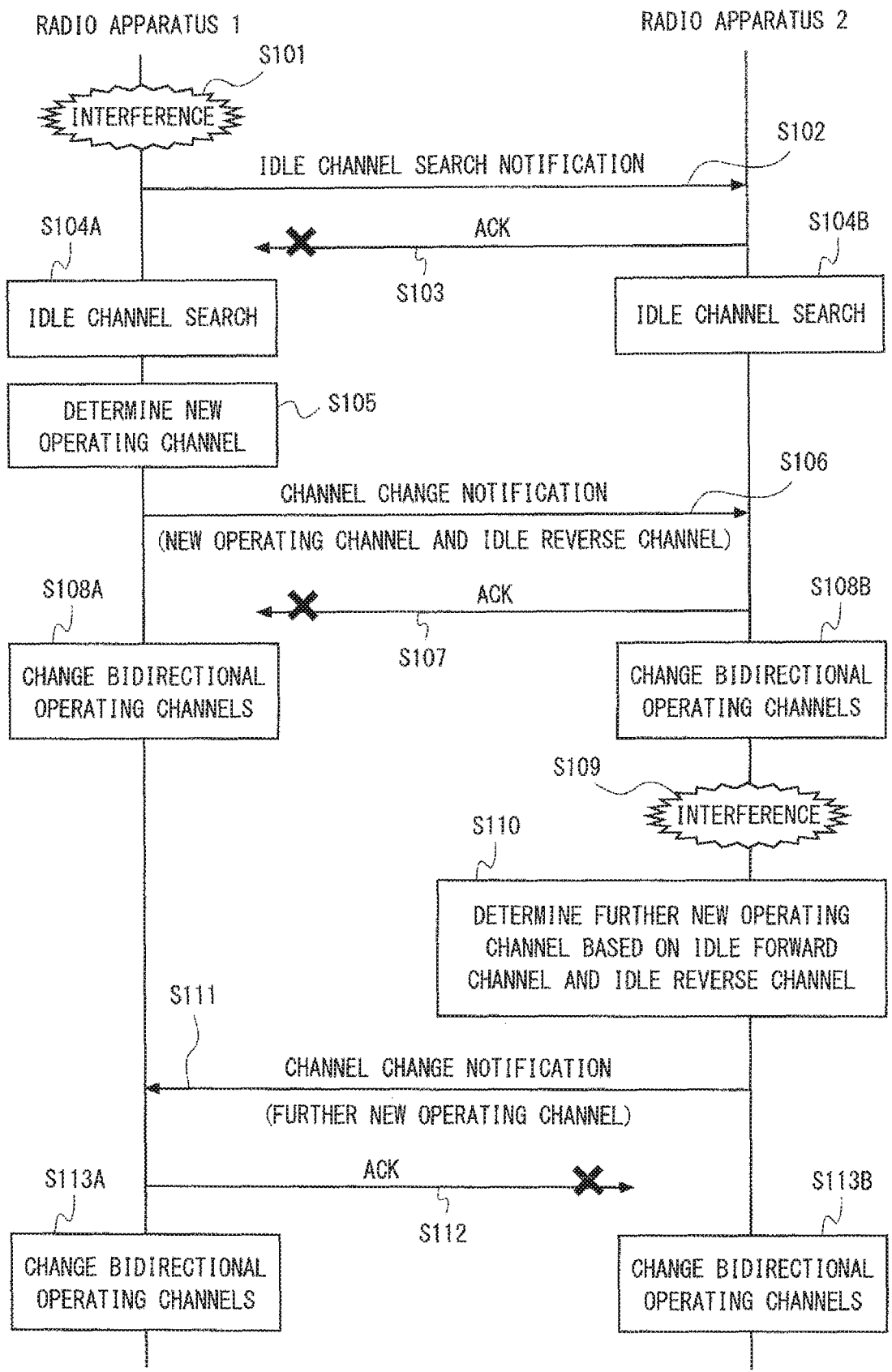
FIG. 3 is a sequence diagram showing a specific example of a procedure for changing operating radio channels according to the first embodiment.

In the following description, a specific example of the procedure for changing the operating radio channels performed by the radio apparatuses 1 and 2 (controllers 12 and 22) is described. FIG. 3 is a sequence diagram showing a specific example of the procedure for changing the operating radio channels according to this embodiment. In Step S101, the radio apparatus 1 detects degradation in reception quality of the reverse link 52. The procedure for changing the operating radio channels is typically performed in order to avoid interference on a specific radio channel from another radio system. Accordingly, the reception quality monitored in Step S101 to trigger the procedure for changing the operating radio channels may typically be a Signal to Interference plus Noise Ratio (SINR). In addition to the SINR, a Received Signal Strength Indicator (RSSI) may be used to distinguish the interference situation from other situations in which the line of sight in the reverse link 52 is degraded due to deterioration in weather conditions or blocking by any obstacles.

In Step S102, in response to the detection of the degradation in the reception quality of the reverse link 52, the radio apparatus 1 transmits a particular notification to the radio apparatus 2 using the current operating radio channel of the forward link 51. The particular notification transmitted in Step S102 may indicate, for example, that an idle channel search is to be performed in the radio apparatus 1 (idle channel search notification). Further or alternatively, the particular notification transmitted in Step S102 may indicate that a failure has been detected in the reverse link 52 or may indicate a request for an idle channel search to the radio apparatus 2.

In Step S103, the radio apparatus 2 transmits a reception notification (Acknowledgement) in response to receiving the particular notification transmitted in Step S102. The reception notification is transmitted on the current operating radio channel of the reverse link 52. However, in the situation in which the reception quality of the reverse link 52 is not satisfactory, it is not guaranteed that the reception notification successfully reach the radio apparatus 1. Accordingly, the transmission of the reception notification in Step S103 may be omitted.

In Steps S104A and S104B, both the radio apparatuses 1 and 2 perform the idle channel search. That is, the radio apparatus 1 searches for an idle channel (i.e., a clear channel or an unoccupied channel) available to use in the reverse link 52. On the other hand, the radio apparatus 2 searches for an idle channel (i.e., a clear channel or an unoccupied channel) available to use in the forward link 51. The channel search in Step S104A may be started in response to the transmission of the particular notification in Step S102 or when a predetermined waiting time has elapsed after the transmission of the particular notification. The channel search in Step S104B may be started in response to the reception of the particular notification in Step S102 or when a predetermined waiting time has elapsed after the reception of the particular notification.

In Step S105, the radio apparatus 1 determines a new reverse channel to be used as the operating radio channel of the reverse link 52 based on the result of the idle reverse channel search in Step S104A. In Step S105, however, the result of the idle forward channel performed by the radio apparatus 2 is not considered. This is because, in the situation in which the reception quality of the reverse link 52 is not satisfactory, it is difficult to successfully send the result of the idle forward channel search from the radio apparatus 2 to the radio apparatus 1.

As described above, the point-to-point radio system according to this embodiment uses FDD with the fixed frequency spacing. Therefore, the new reverse channel determined in Step S105 is associated in advance with the new forward channel. Accordingly, switching of the operating radio channel of the reverse link 52 inevitably causes switching of the operating radio channel of the forward link 51. From this point of view, it can be said that, in Step S105, the radio apparatus 1 determines the pair of the reverse channel and the forward channel to be newly used as the operating radio channels.

In Step S106, the radio apparatus 1 transmits a channel change notification to the radio apparatus 2. The channel change notification is transmitted on the current operating radio channel (i.e., the operating radio channel before the change) of the forward link 51. This is because it is highly likely that the radio apparatus 2 can successfully receive the current operating radio channel of the forward link 51 (i.e., the operating radio channel before the change). If the new forward channel after the change is used, it is not guaranteed that the channel change notification successfully reach the radio apparatus 2, which may make it impossible for communications to be carried out in both the forward link 51 and the reverse link 52.

The channel change notification transmitted in Step S106 explicitly or implicitly indicates the new reverse channel that has been determined in Step S105. The channel change notification contains an identifier to identify at least one of the new forward channel, the new reverse channel, and the pair of new bidirectional operating radio channels. As already described above, the forward channels and the reverse channels are associated with each other in advance in accordance with a fixed frequency relation. Therefore, the identifier of the new reverse channel implicitly indicates the new forward channel. Similarly, the identifier of the new forward channel implicitly indicates the new reverse channel.

Further, the channel change notification transmitted in Step S106 indicates, in addition to the new reverse channel to be used as the operating radio channel of the reverse link 52, at least one idle reverse channel different from the new reverse channel and available to use in the reverse link 52. Each of the at least one idle reverse channel is an idle channel (clear channel or unoccupied channel) that has been found in the idle channel search in Step S104A.

In Step S107, the radio apparatus 2 transmits a reception notification (Acknowledgement) in response to receiving the channel change notification transmitted in Step S106. This reception notification is transmitted on the current operating radio channel (i.e., the operating radio channel before the change) of the reverse link 52. It is not guaranteed, however, that the reception notification successfully reaches the radio apparatus 1. Therefore, similar to the reception notification in Step S103, the transmission of the reception notification in Step S107 may be omitted.

In Steps S108A and S108B, the radio apparatuses 1 and 2 change the bidirectional operating radio channels. That is, the radio apparatuses 1 and 2 change the operating radio channel of the reverse link 52 to the new reverse channel that has been determined in Step S105. At the same time, the radio apparatuses 1 and 2 change the operating radio channel of the forward link 51 to the new forward channel that is associated in advance with the new reverse channel (in accordance with the fixed frequency spacing). The operation in Step S108A may be started in response to the transmission of the change notification transmitted in Step S106 or when a predetermined waiting time has elapsed after the transmission of the change notification. The operation in Step S108B may be started in response to the reception of the change notification transmitted in Step S106 or when a predetermined waiting time has elapsed after the reception of the change notification.

When the reception quality of the new bidirectional operating radio channels after change (that is, the new forward channel and the new reverse channel) is satisfactory, the radio apparatuses 1 and 2 may complete the procedure for changing the operating radio channels. For example, the radio apparatuses 1 and 2 may transmit, to each other on the new radio channels, notifications indicating the completion of the change, thereby completing the procedure for changing the operating radio channels.

It should be noted, however, that at the time of completion of Steps S108A and S108B, the reception quality of the operating radio channel of the forward link 51 after the change (i.e., the new forward channel) in the radio apparatus 2 has not been guaranteed. This is because, since the system is in a unidirectional communication state where the reverse link 52 cannot be normally used during Steps S102 to S108A and S108B, the determination of the new bidirectional operating radio channels to recover the reverse link 52 (Step S105) is performed independently by the radio apparatus 1, which is the reception side of the reverse link 52, and thus the reception quality of the forward link 51 in the radio apparatus 2 is not taken into consideration. Accordingly, there is a possibility that the radio apparatus 2 cannot accurately receive signals on the new forward channel of the forward link 51. In order to deal with this problem, Steps S109 to S113A and S113B shown in FIG. 3 further provide a procedure for normalizing the reception state in the forward link 51.

In Step S109, the radio apparatus 2 detects deterioration in the reception quality of the forward link 51. The reception quality monitored in Step S109 may be an SINR or may be a combination of an SINR and an RSSI. In the example shown in FIG. 3, since the search for idle forward channels has been carried out in Step S104B, the radio apparatus 2 can determine, at the time of reception of the change notification in Step S106, that the reception quality of the new forward channel is not satisfactory based on the result of the search for idle forward channels. Therefore, the radio apparatus 2 may immediately determine that the new forward channel is not appropriate without performing detection of decrease in the reception quality of the forward link 51 in Step S109.

In Step S110, the radio apparatus 2 determines a further new forward channel to be used as the operating radio channel of the forward link 51. The radio apparatus 2 recognizes at least one idle reverse channel reported by the radio apparatus 1 with the change notification transmitted in Step S106. Accordingly, the radio apparatus 2 may determine the further new forward channel from among at least one forward channel associated with at least one idle reverse channel. At least one forward channel is spaced from at least one idle reverse channel by the fixed frequency spacing. To be more specific, the radio apparatus 2 recognizes the idle forward channel(s) by the search performed in Step S104B. Accordingly, the radio apparatus 2 may determine the further new forward channel from among the Cartesian product (i.e., common part or intersection) between the set of the forward channel(s) associated with the idle reverse channel(s) reported by the radio apparatus 1 and the set of the idle forward channel(s) obtained by the search performed in Step S104B.

In Step S111, the radio apparatus 2 transmits a channel change notification to the radio apparatus 1. The channel change notification is transmitted on the new reverse channel that has been applied in Steps S108A and S108B. The channel change notification transmitted in Step S111 explicitly or implicitly indicates the new forward channel that has been determined in Step S110. The channel change notification contains an identifier to identify at least one of the further new forward channel, the further new reverse channel, and the pair of further new bidirectional operating radio channels. As already described above, the forward channels and the reverse channels are associated with each other in accordance with the fixed frequency relation. Therefore, the identifier of the further new reverse channel implicitly indicates the further new forward channel. Similarly, the identifier of the further new forward channel implicitly indicates the further new reverse channel.

In Step S112, the radio apparatus 1 transmits a reception notification (Acknowledgement) in response to receiving the channel change notification transmitted in Step S111. This reception notification is transmitted on the current operating radio channel of the forward link 51 (i.e., the new forward channel after the change in Steps S108A and S108B). However, in the state in which the reception quality of the forward link 51 is not satisfactory, it is not guaranteed that the reception notification successfully reach the radio apparatus 2. Therefore, similar to the reception notifications in Steps S103 and S107, the transmission of the reception notification in Step S112 may be omitted.

In Steps S113A and S113B, the radio apparatuses 1 and 2 change the bidirectional operating radio channels. That is, the radio apparatuses 1 and 2 change the operating radio channel of the forward link 51 to the further new forward channel determined in Step S110. At the same time, the radio apparatuses 1 and 2 change the operating radio channel of the reverse link 52 to the further new reverse channel that is associated in advance with the further new forward channel (in accordance with the fixed frequency spacing). The operation of Step S113A may be started in response to the reception of the change notification in Step S112 or when a predetermined waiting time has elapsed after the reception of the change notification. The operation of Step S113B may be started in response to the transmission of the change notification in Step S112 or when a predetermined waiting time has elapsed after the transmission of the change notification.

As can be understood from the above description, the point-to-point radio apparatuses 1 and 2 according to this embodiment use FDD with the fixed frequency spacing. When a failure occurs in the reverse link 52, the radio apparatus 1 notifies the radio apparatus 2 of the new reverse channel to be used in the reverse link 52 and at least one idle reverse channel, which is different from the new reverse channel, using the current forward link 51. Then the radio apparatuses 1 and 2 change both the operating radio channels of the forward link 51 and the reverse link 52 so as to use the new reverse channel and its corresponding new forward channel (in accordance with the fixed frequency spacing). While the reachability of the reverse link 52 is thus secured, the reachability of the forward link 51 may be lost instead. If the reachability of the forward link 51 is lost, the radio apparatus 2 determines a further new forward channel from at least one forward channel associated with the at least one idle reverse channel, which has been reported by the radio apparatus 1, and notifies the radio apparatus 1 of the determined further new forward channel. The radio apparatuses 1 and 2 then change both the operating radio channels of the forward link 51 and the reverse link 52 so as to use the further new forward channel and its corresponding further new reverse channel (in accordance with the fixed frequency spacing). By the employment of this change procedure, the radio apparatuses 1 and 2 can safely switch the bidirectional operating radio channels without using a redundant connection for maintenance or for control and thus can safely recover from the unidirectional communication state.

The procedure for changing the operating radio channels shown in FIG. 3 is merely one example and may be partially changed. For example, in Step S111, the radio apparatus 2 may notify the radio apparatus 1 of another idle forward channel(s) in addition to the further new forward channel to be used in the forward link 51. It is therefore possible to cope with a situation in which the reverse channel associated with the further new forward channel determined by the radio apparatus 2 (in accordance with the fixed frequency spacing) is not appropriate for the radio apparatus 1. That is, the radio apparatus 1 may determine the next further new reverse channel from among the Cartesian product (i.e., common part or intersection) between the set of the idle reverse channel(s) associated with the idle forward channel(s) reported by the radio apparatus 2 and the set of the idle reverse channel(s) obtained by the search in Step S104A.

Further, the arrangement of the idle channel searches (Steps S104A and S104B) shown in FIG. 3 may be changed as appropriate. A modified example of the arrangement of the idle channel searches is described in the following second and third embodiments.

Second Embodiment

In this embodiment, a modified example of the procedure for changing the operating radio channels described in the first embodiment is described. A configuration example of the point-to-point radio system according to this embodiment is the same as that shown in FIG. 2.

Figure 4:
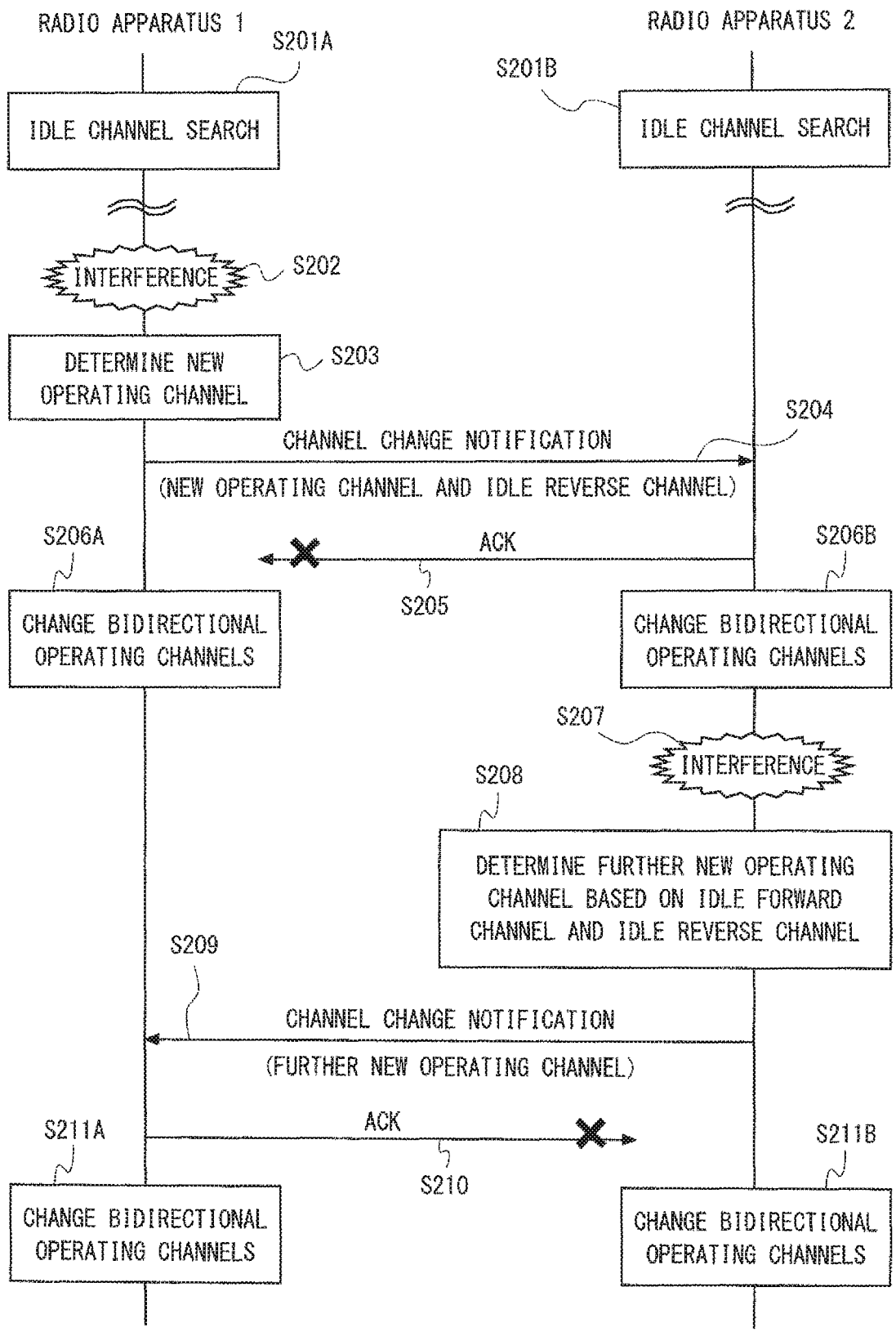
FIG. 4 is a sequence diagram showing a specific example of a procedure for changing operating radio channels according to a second embodiment.

FIG. 4 is a sequence diagram showing a specific example of the procedure for changing the operating radio channels performed by the radio apparatuses 1 and 2 (controllers 12 and 22). In the example shown in FIG. 4, the arrangement of the idle channel searches is mainly changed compared to the case shown in FIG. 3. That is, in the example shown in FIG. 4, the radio apparatuses 1 and 2 perform the idle reverse channel search (Step S201A) and the idle forward channel search (Step S201B) at a desired timing before the detection of the failure in the reverse link 52 (Step S202). For example, the radio apparatuses 1 and 2 may perform the idle channel searches during a downtime scheduled by an operator.

The processes in Steps S203 to S211A and S211B in FIG. 4 are similar to the processes in Steps S105 to S113A and S113B in FIG. 3, and thus the repeated description is omitted. Note that, in Step S203, the result of the idle reverse channel search in Step S201A is used. In Step S208, the result of the idle forward channel search in Step S201B is used.

According to the procedure shown in FIG. 4, the effects similar to those described in the first embodiment can be achieved. That is, the radio apparatuses 1 and 2 can safely switch the bidirectional operating radio channels without using a redundant connection for maintenance or for control and thus can safely recover from the unidirectional communication state.

Further, according to the procedure shown in FIG. 4, idle channels can be recognized in advance before a failure is detected, which contributes to a prompt recovery from the unidirectional communication state in which the reverse link 52 cannot be used. However, when a certain period of time has elapsed after the idle channel searches in Steps S201A and S201B, the quality of idle channels that was clear at the time of idle channel searches may be degraded. Accordingly, in Step S203, the radio apparatus 1 preferably checks the reception quality of one reverse channel to be selected as the new operating radio channel of the reverse link 52. This check can be done in a short period of time compared to the idle channel search in the whole frequency band of the forward channel. In a similar way, in Step S208, the radio apparatus 2 preferably checks the reception quality of one forward channel to be selected as the further new operating radio channel of the forward link 51.

Third Embodiment

In this embodiment, another modified example of the procedure for changing the operating radio channels described in the first embodiment is described. A configuration example of a point-to-point radio system according to this embodiment is the same as that shown in FIG. 2.

Figure 5:
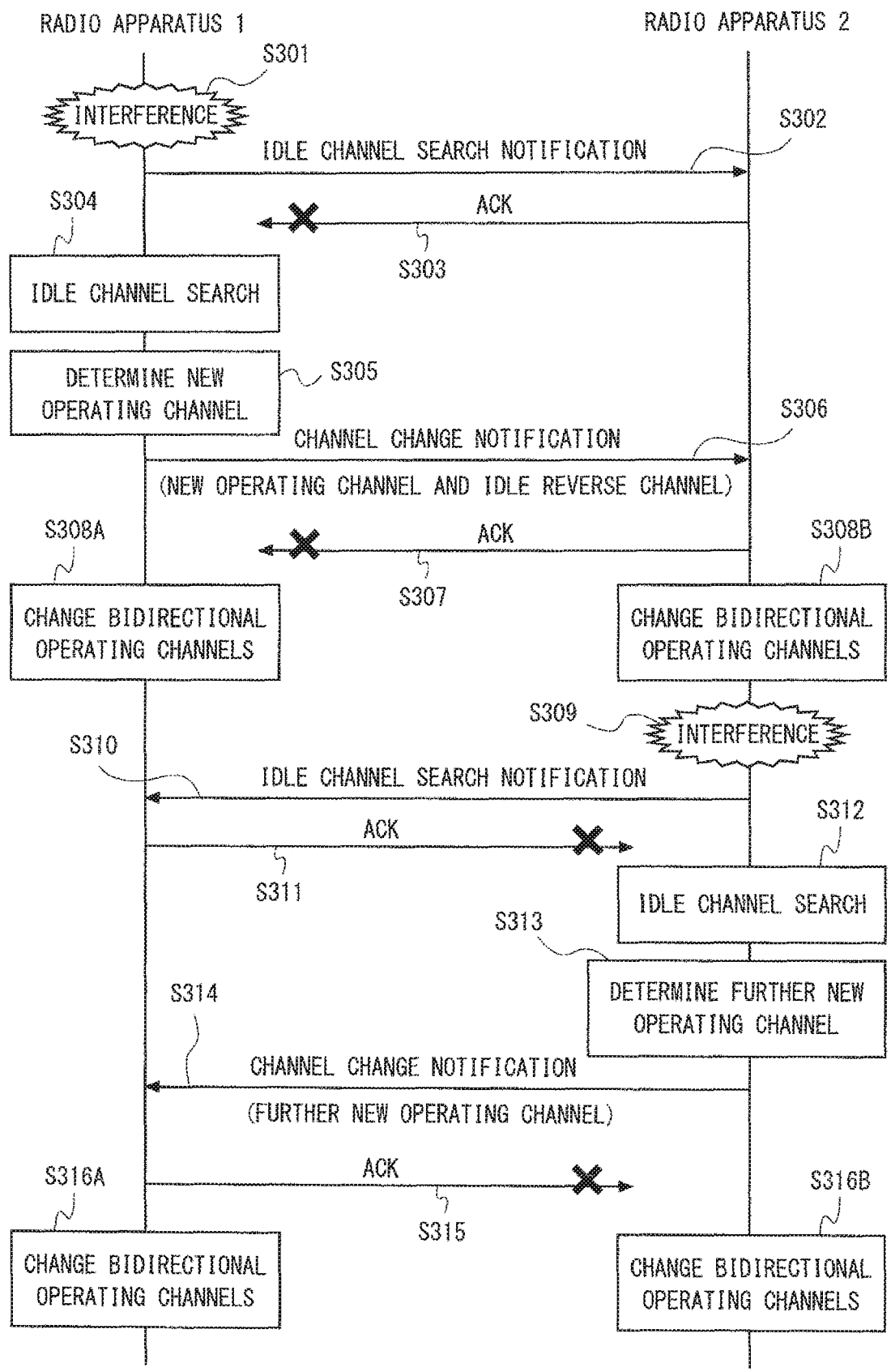
FIG. 5 is a sequence diagram showing a specific example of a procedure for changing operating radio channels according to a third embodiment.

FIG. 5 is a sequence diagram showing a specific example of the procedure for changing the operating radio channels performed by the radio apparatuses 1 and 2 (controllers 12 and 22). In the example shown in FIG. 5, the arrangement of the idle channel searches is mainly changed compared to the example shown in FIG. 3. That is, in the example shown in FIG. 5, the radio apparatus 2 performs the idle forward channel search (Step S312) after the radio apparatus 2 detects a failure in the forward link 51 (Step S309).

The processes in Steps S301 to S303 and S305 to S309 in FIG. 5 are similar to the processes in Steps S101 to S103 and S105 to S109 in FIG. 3. In Step S304, the radio apparatus 1 performs the idle reverse channel search. On the other hand, unlike FIG. 3, the radio apparatus 2 does not perform the idle forward channel search.

In Step S310, in response to the detection of the degradation in the reception quality of the forward link 51, the radio apparatus 2 transmits a particular notification to the radio apparatus 1 using the current operating radio channel of the reverse link 52 (i.e., the new reverse channel after the change in Steps S308A and S308B). The particular notification transmitted in Step S310 may indicate, for example, that an idle channel search is to be performed in the radio apparatus 2 (idle channel search notification). Further or alternatively, the particular notification transmitted in Step S310 may indicate that a failure has been detected in the forward link 51.

In Step S311, the radio apparatus 1 transmits a reception notification (Acknowledgement) in response to receiving the notification transmitted in Step S310. This reception notification is transmitted on the current operating radio channel of the forward link 51 (i.e., the new forward channel after the change in Steps S308A and S308B). However, in the state in which the reception quality of the forward link 51 is not satisfactory, it is not guaranteed that the reception notification successfully reach the radio apparatus 2. Accordingly, the transmission of the reception notification in Step S311 may be omitted.

In Step S312, the radio apparatus 2 searches for an idle channel (a clear channel or an unoccupied channel) available to use in the forward link 51. The channel search performed in Step S312 may be started in response to the transmission of the particular notification in Step S310 or when a predetermined waiting time has elapsed after the transmission of the particular notification.

The processes in Steps S313 to S316A and S316B are similar to the processes in Steps S110 to S113A and S113B in FIG. 3. In Step S313, the result of the idle forward channel search in Step S312 is used.

According to the procedure shown in FIG. 5, the effects similar to those described in the first embodiment can be achieved. That is, the radio apparatuses 1 and 2 can safely switch the bidirectional operating radio channels without using a redundant connection for maintenance or for control and thus can safely recover from the unidirectional communication state.

Other Embodiments

The processes regarding the procedure for changing the operating radio channels performed by each of the aforementioned radio apparatuses 1 and 2 (controllers 12 and 22) may be implemented using a semiconductor processing device including an Application Specific Integrated Circuit (ASIC). Further, these processes may be implemented by causing a computer including at least one processor (e.g., microprocessor, Micro Processing Unit (MPU), Central Processing Unit (CPU)) to execute a program. Specifically, one or more programs containing instructions to cause a computer system to perform the algorithms described using the sequence diagrams in this specification may be created and these programs may be supplied to the computer system.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g., electric wires, and optical fibers) or a wireless communication line.

Further, the above embodiments are merely examples of applications of technical ideas obtained by the present inventors. Needless to say, these technical ideas are not limited to the above embodiments, and the above embodiments may be modified in various ways.

This application is based upon and claims the benefit of priority from Japanese Patent Application No. 2014-054548, filed on Mar. 18, 2014, the disclosure of which is incorporated herein in its entirety by reference.

REFERENCE SIGNS LIST 1, 2 POINT-TO-POINT RADIO APPARATUS
10, 20 ANTENNA
11, 21 TRANSCEIVER (RADIO TRANSCEIVER)
12, 22 CONTROLLER

The invention claimed is:

1. A point-to-point radio system comprising first and second radio apparatuses configured to perform a bidirectional point-to-point radio communication, wherein
the first and second radio apparatuses are configured to cooperatively perform a procedure for changing an operating radio channel of a forward link from the first radio apparatus to the second radio apparatus and an operating radio channel of a reverse link from the second radio apparatus to the first radio apparatus, and
the procedure comprises:
transmitting, by the first radio apparatus, to the second radio apparatus, a first notification indicating a new reverse channel to be used as the operating radio channel of the reverse link and indicating at least one idle reverse channel that is different from the new reverse channel and available to use in the reverse link; and
determining, by the second radio apparatus, a further new forward channel to be used as the operating radio channel of the forward link from among at least one forward channel associated with the at least one idle reverse channel.

2. The point-to-point radio system according to claim 1, wherein the procedure further comprises changing, after the transmission of the first notification, by both the first and second radio apparatuses, the operating radio channels of the reverse link and the forward link to the new reverse channel and a new forward channel associated with the new reverse channel, respectively.

3. The point-to-point radio system according to claim 1, wherein the first notification is transmitted on the forward link using a current operating radio channel of the forward link.

4. The point-to-point radio system according to claim 1, wherein the procedure further comprises:
transmitting by the second radio apparatus to the first radio apparatus a second notification indicating the further new forward channel; and
changing, after the transmission of the second notification, by both the first and second radio apparatuses, the operating radio channels of the forward link and the reverse link, respectively, to the further new forward channel and one of the at least one idle reverse channel associated with the further new forward channel.

5. The point-to-point radio system according to claim 4, wherein the second notification is transmitted on the reverse link using the new reverse channel.

6. The point-to-point radio system according to claim 4, wherein the second notification further indicates at least one idle forward channel different from the further new forward channel and available to use in the forward link.

7. The point-to-point radio system according to claim 6, wherein the procedure further comprises selecting, by the first radio apparatus, a next reverse channel from among at least one reverse channel associated with the at least one idle forward channel.

8. The point-to-point radio system according to claim 4, wherein
the first notification indicates an identifier of a pair of radio channels corresponding to the new reverse channel and an identifier of a pair of radio channels corresponding to the at least one idle reverse channel, and
the second notification indicates an identifier of a pair of radio channels corresponding to the further new forward channel.

9. The point-to-point radio system according to claim 1, wherein
the first and second radio apparatuses are configured to communicate with each other using Frequency Division Duplexing with fixed frequency spacing, and
the operating radio channel of the forward link is spaced from the operating radio channel of the reverse link by the fixed frequency spacing.

10. The point-to-point radio system according to claim 9, wherein
the new reverse channel is associated with a new forward channel in accordance with the fixed frequency spacing, and
the further new forward channel is associated with one of the at least one idle reverse channel in accordance with the fixed frequency spacing.

11. The point-to-point radio system according to claim 1, wherein the procedure further comprises:
transmitting, by the first radio apparatus to the second radio apparatus, before the transmission of the first notification, a third notification in response to detecting a decrease in the reception quality of the reverse link in the first radio apparatus; and performing, after the transmission of the third notification but before the transmission of the first notification, a search for an idle channel of the reverse link in the first radio apparatus and performing a search for an idle channel of the forward link in the second radio apparatus.

12. The point-to-point radio system according to claim 1, wherein the determining in the procedure comprises determining, by the second radio apparatus, the further new forward channel when a reception quality of a new forward channel associated with the new reverse channel is not satisfactory.

13. A point-to-point radio apparatus comprising:
a radio transceiver configured to communicate with a counterpart apparatus by means of a point-to-point radio technology; and
a controller comprising at least one hardware processor configured to perform a procedure for changing an operating radio channel of a forward link from the point-to-point radio apparatus to the counterpart apparatus and an operating radio channel of a reverse link from the counterpart apparatus to the point-to-point radio apparatus, wherein
the procedure comprises transmitting to the counterpart apparatus a first notification indicating a new reverse channel to be used as the operating radio channel of the reverse link and indicating at least one idle reverse channel different from the new reverse channel and available to use in the reverse link, and
the procedure further comprises receiving from the counterpart apparatus a second notification indicating a further new forward channel that is determined by the counterpart apparatus from among at least one forward channel associated with the at least one idle reverse channel.

14. The point-to-point radio apparatus according to claim 13, wherein the first notification is transmitted on the forward link using a current operating radio channel of the forward link.

15. The point-to-point radio apparatus according to claim 14, wherein the receiving in the procedure comprises receiving from the counterpart apparatus the second notification when a reception quality of a new forward channel associated with the new reverse channel is not satisfactory.

16. The point-to-point radio apparatus according to claim 13, wherein the procedure further comprises changing, after the transmission of the first notification, the operating radio channels of the reverse link and the forward link, respectively, to the new reverse channel and a new forward channel associated with the new reverse channel.

17. The point-to-point radio apparatus according to claim 13, wherein the procedure further comprises changing, after the reception of the second notification, the operating radio channels of the forward link and the reverse link, respectively, to the further new forward channel and one of the at least one idle reverse channel associated with the further new forward channel.

18. The point-to-point radio apparatus according to claim 13, wherein the second notification is transmitted on the reverse link using the new reverse channel.

19. The point-to-point radio apparatus according to claim 13, wherein the second notification further indicates at least one idle forward channel different from the further new forward channel and available to use in the forward link.

20. The point-to-point radio apparatus according to claim 13, wherein
the point-to-point radio apparatus and the counterpart apparatus are configured to communicate with each other using Frequency Division Duplexing with fixed frequency spacing, and
the operating radio channel of the forward link is spaced from the operating radio channel of the reverse link by the fixed frequency spacing.

21. The point-to-point radio apparatus according to claim 13, wherein the procedure further comprises:
transmitting, before the transmission of the first notification, a third notification to the counterpart apparatus in response to detecting a decrease in the reception quality of the reverse link in the point-to-point radio apparatus; and
performing, after the transmission of the third notification but before the transmission of the first notification, a search for an idle channel of the reverse link.

22. A point-to-point radio apparatus comprising:
a radio transceiver configured to communicate with a counterpart apparatus by means of a point-to-point radio technology; and
a controller comprising at least one hardware processor configured to perform a procedure for changing an operating radio channel of a forward link from the counterpart apparatus to the point-to-point radio apparatus and an operating radio channel of a reverse link from the point-to-point radio apparatus to the counterpart apparatus, wherein the procedure comprises:
receiving from the counterpart apparatus a first notification indicating a new reverse channel to be used as the operating radio channel of the reverse link and indicating at least one idle reverse channel different from the new reverse channel and available to use in the reverse link; and
determining a further new forward channel from among at least one forward channel associated with the at least one idle reverse channel.

23. The point-to-point radio apparatus according to claim 22, wherein the procedure further comprises changing, after the reception of the first notification, the operating radio channels of the reverse link and the forward link, respectively, to the new reverse channel and a new forward channel associated with the new reverse channel.

24. The point-to-point radio apparatus according to claim 22, wherein the first notification is transmitted on the forward link using a current operating radio channel of the forward link.

25. The point-to-point radio apparatus according to claim 22, wherein the procedure further comprises:
transmitting to the counterpart apparatus a second notification indicating the further new forward channel; and
changing, after the transmission of the second notification, the operating radio channels of the forward link and the reverse link, respectively, to the further new forward channel and one of the at least one idle reverse channel associated with the further new forward channel.

26. The point-to-point radio apparatus according to claim 25, wherein the second notification is transmitted on the reverse link using the new reverse channel.

27. The point-to-point radio apparatus according to claim 25, wherein the second notification further indicates at least one idle forward channel different from the further new forward channel and available to use in the forward link.

28. The point-to-point radio apparatus according to claim 22, wherein
the point-to-point radio apparatus and the counterpart apparatus are configured to communicate with each other using Frequency Division Duplexing with fixed frequency spacing, and
the operating radio channel of the forward link is spaced from the operating radio channel of the reverse link by the fixed frequency spacing.

29. The point-to-point radio apparatus according to claim 22, wherein the procedure further comprises:
receiving, before the reception of the first notification, from the counterpart apparatus a third notification in response to detection by the counterpart apparatus of a decrease in the reception quality of the reverse link; and
performing a search for an idle channel of the forward link after the reception of the third notification but before the reception of the first notification.

30. The point-to-point radio apparatus according to claim 22, wherein the determining in the procedure comprises determining the further new forward channel when a reception quality of a new forward channel associated with the new reverse channel is not satisfactory.

31. A communication control method performed by a point-to-point radio apparatus configured to communicate with a counterpart apparatus by means of a point-to-point radio technology on a forward link from the point-to-point radio apparatus to the counterpart apparatus and on a reverse link from the counterpart apparatus to the point-to-point radio apparatus, the communication control method comprising:
transmitting to the counterpart apparatus a first notification indicating a new reverse channel to be used as an operating radio channel of the reverse link and indicating at least one idle reverse channel different from the new reverse channel and available to use in the reverse link, and
receiving from the counterpart apparatus a second notification indicating a further new forward channel that is determined by the counterpart apparatus from among at least one forward channel associated with the at least one idle reverse channel.

32. A communication control method performed by a point-to-point radio apparatus configured to communicate with a counterpart apparatus by means of a point-to-point radio technology on a forward link from the counterpart apparatus to the point-to-point radio apparatus and on a reverse link from the point-to-point radio apparatus to the counterpart apparatus, the communication control method comprising:
receiving from the counterpart apparatus a first notification indicating a new reverse channel to be used as an operating radio channel of the reverse link and indicating at least one idle reverse channel different from the new reverse channel and available to use in the reverse link; and
determining a further new forward channel to be used as an operating radio channel of the forward link from among at least one forward channel associated with the at least one idle reverse channel.

33. The communication control method according to claim 32, wherein the determining comprises determining the further new forward channel when a reception quality of a new forward channel associated with the new reverse channel is not satisfactory.

34. A non-transitory computer readable medium storing a program for causing a computer to perform a communication control method performed by a point-to-point radio apparatus configured to communicate with a counterpart apparatus by means of a point-to-point radio technology on a forward link from the point-to-point radio apparatus to the counterpart apparatus and on a reverse link from the counterpart apparatus to the point-to-point radio apparatus, wherein the method comprises:
transmitting to the counterpart apparatus a first notification indicating a new reverse channel to be used as an operating radio channel of the reverse link and indicating at least one idle reverse channel different from the new reverse channel and available to use in the reverse link, and
receiving from the counterpart apparatus a second notification indicating a further new forward channel that is determined by the counterpart apparatus from among at least one forward channel associated with the at least one idle reverse channel.

35. A non-transitory computer readable medium storing a program for causing a computer to perform a communication control method performed by a point-to-point radio apparatus configured to communicate with a counterpart apparatus by means of a point-to-point radio technology on a forward link from the counterpart apparatus to the point-to-point radio apparatus and on a reverse link from the point-to-point radio apparatus to the counterpart apparatus, wherein the method comprises:
receiving from the counterpart apparatus a first notification indicating a new reverse channel to be used as an operating radio channel of the reverse link and indicating at least one idle reverse channel different from the new reverse channel and available to use in the reverse link; and
determining a further new forward channel to be used as an operating radio channel of the forward link from among at least one forward channel associated with the at least one idle reverse channel.

36. The non-transitory computer readable medium according to claim 35, wherein the determining comprises determining the further new forward channel when a reception quality of a new forward channel associated with the new reverse channel is not satisfactory.

* * * * *